US012801512B2

(12) United States Patent
Sun et al.

(10) Patent No.: US 12,801,512 B2
(45) Date of Patent: Nov. 17, 2026

(54) SELF-TUNING MERGED CODE TESTING

(71) Applicant: INTERNATIONAL BUSINESS MACHINES CORPORATION, Armonk, NY (US)

(72) Inventors: Sheng Yan Sun, Beijing (CN); Ting Ting Wen, Beijing (CN); Peng Hui Jiang, Beijing (CN); Wu Di, Beijing (CN); Qing Zhi Yu, Beijing (CN); Peng Huang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 18/450,514

(22) Filed: Aug. 16, 2023

(65) Prior Publication Data

US 2025/0061047 A1 Feb. 20, 2025

(51) Int. Cl.
*G06F 9/44* (2018.01)
*G06F 11/3668* (2025.01)

(52) U.S. Cl.
CPC ........ *G06F 11/368* (2013.01); *G06F 11/3692* (2013.01)

(58) Field of Classification Search
None
See application file for complete search history.

(56) References Cited

U.S. PATENT DOCUMENTS 7,379,846 B1 5/2008 Williams et al.
9,183,123 B2 11/2015 Spektor et al.
9,652,509 B2 5/2017 Shani et al.
9,921,952 B2 3/2018 Dean et al.
9,946,629 B2 * 4/2018 Horesh ................. G06F 11/366
2005/0257086 A1 11/2005 Triou et al.
2009/0222697 A1 * 9/2009 Thakkar .............. G06F 11/3676 714/38.1
2017/0116114 A1 4/2017 Tosar et al.

(Continued)

FOREIGN PATENT DOCUMENTS

CN 104185840 B 12/2014

OTHER PUBLICATIONS

Anonymous, "Self-Tuning GUI Automation Test Cases in DevOps System", IP.com No. IPCOM000255436D, published Sep. 27, 2018 (6 pages) (Year: 2018).

(Continued)

*Primary Examiner* — Lanny N Ung
(74) *Attorney, Agent, or Firm* — Eric Chesley, Esq; Kevin P. Radigan, Esq.; Heslin Rothenberg Farley & Mesiti P.C.

(57) ABSTRACT

Self-tuning merged code testing is provided which includes testing merged code using a suite of test cases, where the merged code includes one or more code changes, and obtaining, based on the testing, a test case failure using the suite of test cases. Further, the process includes determining, using an artificial intelligence engine, a likely faulty code change of the one or more code changes resulting in the test case failure, and customizing, based on the likely faulty code change, the suite of test cases to facilitate verifying that the likely faulty code change is a faulty code change. In addition, the process includes continuing testing of the merged code using the customized suite of test cases to facilitate verifying that the likely faulty code change is the faulty code change.

15 Claims, 15 Drawing Sheets

(56) References Cited

U.S. PATENT DOCUMENTS

| | | | | |
|---|---|---|---|---|
| 2017/0212829 | A1 | 7/2017 | Bales et al. | |
| 2017/0262360 | A1 | 9/2017 | Kochura et al. | |
| 2019/0065357 | A1 | 2/2019 | Brafman et al. | |
| 2021/0064518 | A1* | 3/2021 | Abu Taha | G06N 20/00 |
| 2021/0287109 | A1* | 9/2021 | Cmielowski | G06N 20/00 |
| 2021/0390011 | A1* | 12/2021 | Cser | G06N 3/047 |
| 2022/0327012 | A1* | 10/2022 | Roy | G06N 20/20 |
| 2023/0055527 | A1* | 2/2023 | Majithia | G06F 11/079 |
| 2024/0427900 | A1* | 12/2024 | Aloraini | G06F 21/577 |

OTHER PUBLICATIONS

Guimaraes et al., "Improving Early Detection of Software Merge Conflicts", Proceedings—International Conference on Software Engineering, Jun. 2012, https://www.researchgate.net/publication/254040877 (12 pages) (Year: 2012).

Shen et al., "Automatic Detection and Resolution of Software Merge Conflicts: Are We There Yet?", arXiv:2102.11307v2 [cs.SE], published Mar. 3, 2021 (11 pages) (Year: 2021).

* cited by examiner

DB SERVICE: BUFFER POOL, ENGINE, RDS, ETC.

DB FUNCTION: PARSER, OPTIMIZER, RUN TIME, TRANSFORMATION,... ETC,

TEST CASE QUERY ORGANIZATION: VERB, LIST FIELDS, PREDICATE, FUNCTION, ETC.

EFFECTIVE MODULES QUERY USED: SELECT, GROUP, HAVING, JOIN... ETC.

FIG. 11A

HOW IT WORKS: GENERATE CASE MAPPING SAMPLE

| RECV TIME(VM) | RECV TIME(DB) | BUILD LIST APARAPPLY STATUS | APAR | COMMENT | SUCCESS TEST CASE | FAILED TEST CASE | NOT RUN TEST CASE | BLOCKED TEST CASE | PROGRESS | TOTAL TEST CASE |
|---|---|---|---|---|---|---|---|---|---|---|
| 08/28/2019 08:09:25 | 08/28/2019 08:09:25 | G0901 | AH13240C | | 9423 | 0 | 0 | 159 | 100% | 9582 |
| 08/29/2019 13:09:37 | 08/29/2019 13:09:37 | G0901 | AH15897C | | 9419 | 4 | 0 | 159 | 99% | 9582 |
| 08/30/2019 15:15:33 | 08/30/2019 15:15:33 | G0901 | AH15256C | | 9404 | 11 | 8 | 159 | 96% | 9582 |
| 08/30/2019 17:45:15 | 08/30/2019 17:45:15 | G0901 | AH11204C | | 9404 | 11 | 8 | 159 | 96% | 9582 |
| 08/31/2019 22:20:47 | 08/31/2019 22:20:47 | G0901 | AH15432C | | 2873 | 351 | 6199 | 159 | 2% | 9582 |

Fail Test case Detail(APAR AH15342C ):

| ☐ | Test Case Name | Category | Cycle | Lib | Status | Execution Time |
|---|---|---|---|---|---|---|
| ☐ | DN173201(TX01NDEP) | CNN12_FLM504_VL | C225522M100 | PM | fail | 2019-09-01 20:45:00 |
| ☐ | P196UNNX(TX00SS01) | CND33_MOS_COW_SCR0456 | C225522M100 | STLVM14 | fail | 2019-09-01 21:48:00 |
| ☐ | L825OBJ(TXCOX002) | CDD12_C0-EX | C215023M502 | P2 | fail | 2019-09-01 03:56:00 |

Fail Test case Detail(APAR AH15342C ):

| ☐ | Test Case Name | Category | Cycle | Lib | Status | Execution Time |
|---|---|---|---|---|---|---|
| ☐ | IMIPT2SN(TESTCASE) | CSN48 | | | none | |
| ☐ | P319MN01(TX01N001) | CSN48 | | | none | |
| ☐ | P196UNNW(TX00SS1P) | CND33_MOS_COW_SCR0456 | | | none | |

Fail Test case Detail(APAR AH15342C ):

| ☐ | Test Case Name | Category | Cycle | Lib | Status | Execution Time |
|---|---|---|---|---|---|---|
| ☐ | P196SNA5(TX01S002) | CND13_SCR04567 | | | defect | |
| ☐ | MLSETUP(TCX00004) | CSN48_LARGE | | | defect | |
| ☐ | MLSCLNUP(TCX00004) | CSN48_LARGE | | | defect | |

FIG. 13

SELF-TUNING MERGED CODE TESTING

BACKGROUND

This disclosure relates generally to facilitating processing within a computing environment, and in particular, to facilitating testing program code, such as facilitating regression testing of merged code in a development and operational (DevOps) computing environment.

DevOps is a software application development methodology that emphasizes automation, integration, collaboration and communication between development and operational stages of the software life cycle. A key measure of DevOps success is the quality of the resultant software and system developed with the DevOps method.

A DevOps method for software development and operation can include planning and design testing, including planning and designing one or more test cases, coding the test cases, building and deploying a test infrastructure, running the designed end-to-end tests, releasing the software product, deploying the software on a production system and running the test cases on the production system during operation of the production system, monitoring and collecting data from the production system, such as for identifying a missing test, and end-to-end orchestration of the DevOps pipeline.

SUMMARY

Certain shortcomings of the prior art are overcome, and additional advantages are provided herein through the provision of a computer-implemented method of facilitating processing within a computing environment. The computer-implemented method includes testing merged code using a suite of test cases, where the merged code includes one or more code changes, and obtaining, based on the testing, a test case failure using the suite of test cases. In addition, the computer-implemented method includes determining, using an artificial intelligence engine, a likely faulty code change of the one or more code changes resulting in the test case failure, and customizing, based on the likely faulty code change the suite of test cases to facilitate verifying that the likely faulty code change is a faulty code change. In addition, the computer-implemented method includes continuing testing of the merged code using the customized suite of test cases to facilitate verifying that the likely faulty code change is the faulty code change.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 11A-11C illustrate one embodiment of classifying of changes in merged code under test based on database function module groups of the code change(s), in accordance with one or more aspects of the present disclosure;

FIG. 13 depicts one embodiment of detailed code change test mapping, in accordance with one or more aspects of the present disclosure.

DETAILED DESCRIPTION

The accompanying figures, which are incorporated in and form a part of this specification, further illustrate the present disclosure and, together with this detailed description of the disclosure, serve to explain aspects of the present disclosure. Note in this regard that descriptions of well-known systems, devices, processing techniques, etc., are omitted so as to not unnecessarily obscure the disclosure in detail. It should be understood, however, that the detailed description and this specific example(s), while indicating aspects of the disclosure, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
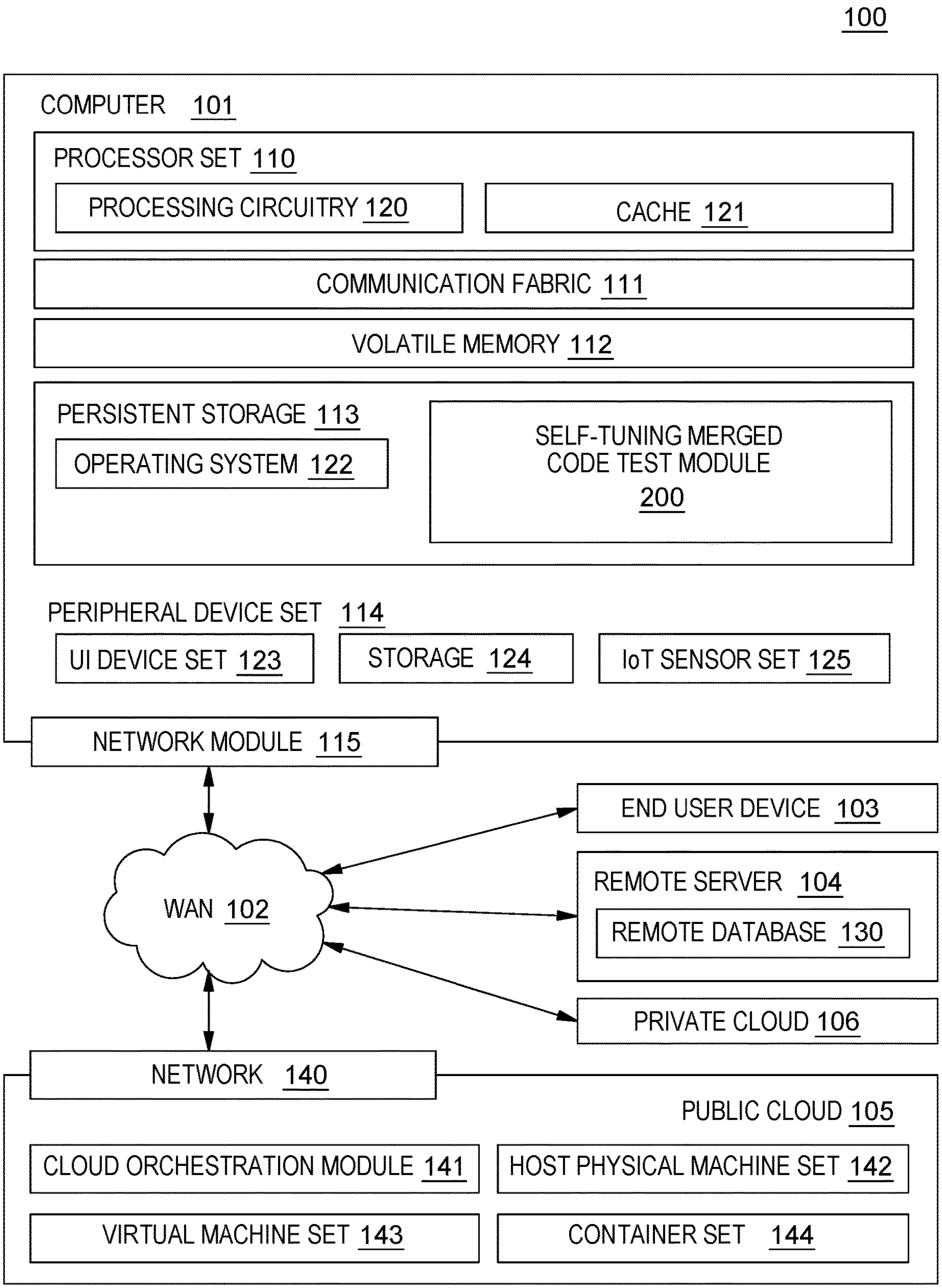
FIG. 1 depicts one example of a computing environment to include and/or use one or more aspects of the present disclosure.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and self-tuning merged code test module 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform self-tuning merged code test processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as self-tuning merged code test module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2:
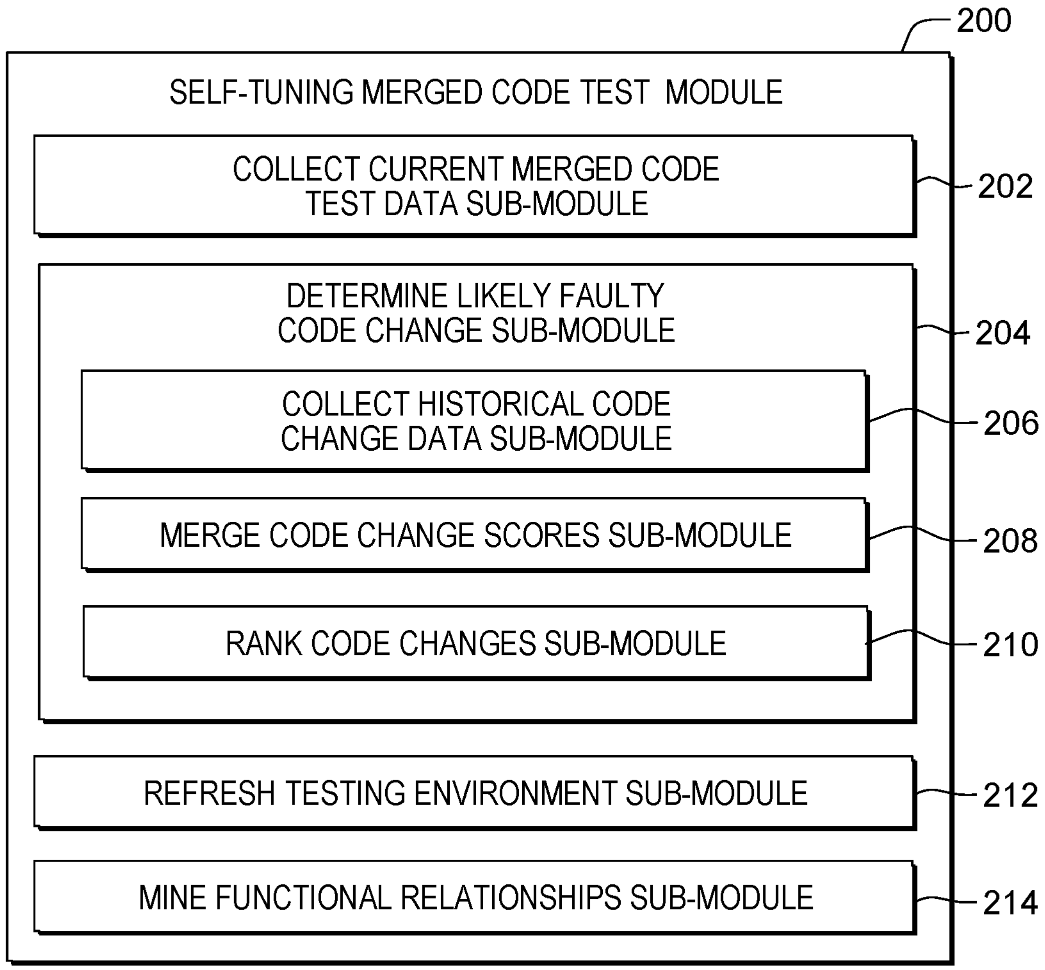
FIG. 2 depicts one embodiment of a computer program product with a self-tuning merged code test module, in accordance with one or more aspects of the present disclosure.
Figure 3:
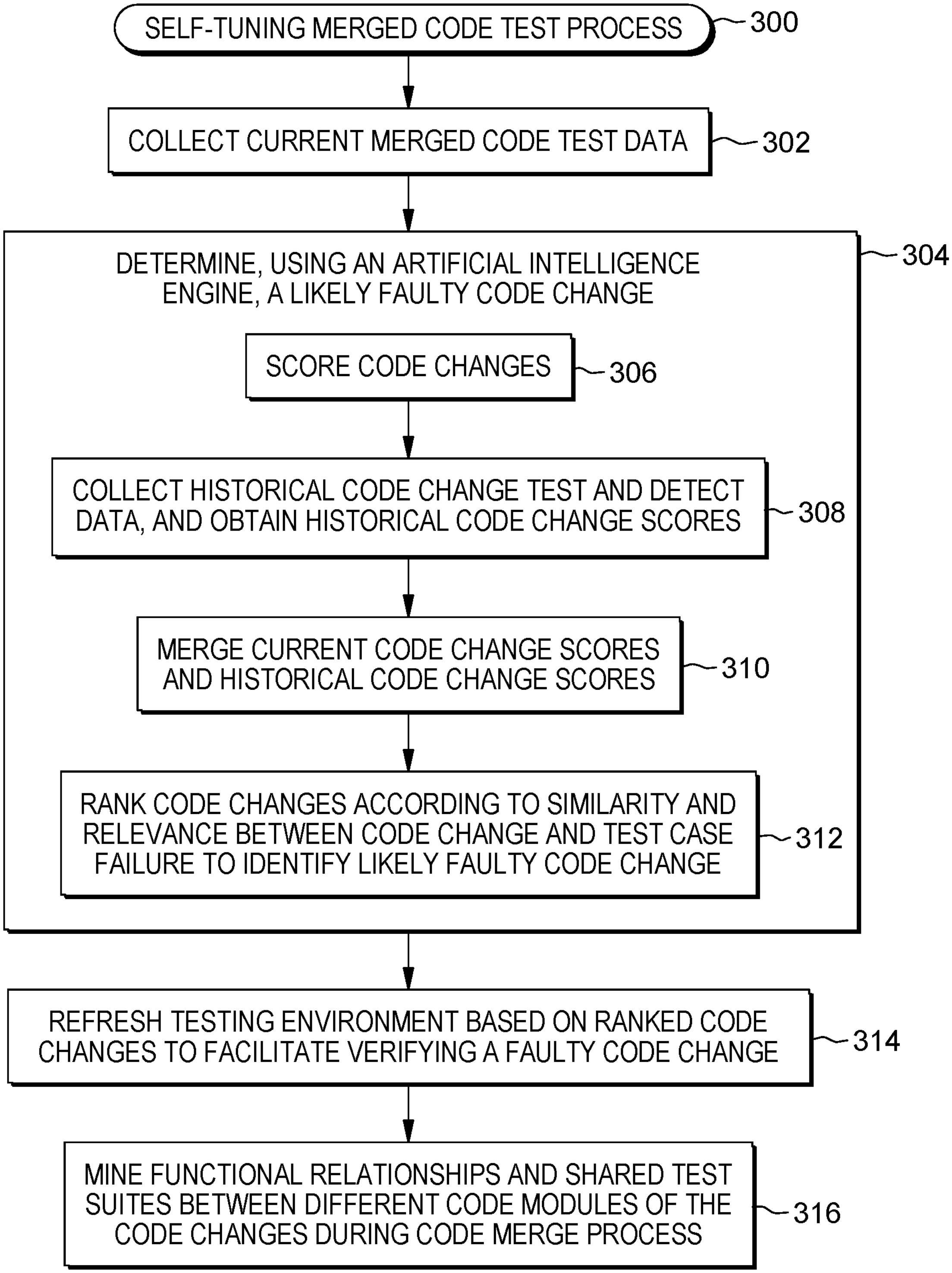
FIG. 3 depicts one embodiment of a self-tuning merged code test process, in accordance with one or more aspects of the present disclosure.

By way of example, one or more embodiments of a self-tuning merged code test module and workflow are described initially with reference to FIGS. 2-3. FIG. 2 depicts one embodiment of self-tuning merged code test module 200 that includes code or instructions to perform a self-tuning merged code test workflow, in accordance with one or more aspects of the present disclosure, and FIG. 3 depicts one embodiment of a self-tuning merged code test workflow, in accordance with one or more aspects of the present disclosure.

Referring to FIGS. 1 & 2, self-tuning merged code test module 200 includes, in one example, various sub-modules used to perform processing, in accordance with one or more aspects of the present disclosure. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of self-tuning merged code test module 200 include, for instance, a collect current merged code test data sub-module 202, which includes, in one or more embodiments, program code or instructions to test merged code using a suite of test cases, where the merged code includes one or more code changes, and to obtain, based on the testing, one or more test case failures using the suite of test cases.

Self-tuning merged code test module 200 further includes, in one or more embodiments, a determine likely faulty code change sub-module 204 to determine, for instance, using an artificial intelligence engine, a likely faulty code change of the one or more code changes resulting in the test case failure. In one or more implementations, determining likely faulty code change sub-module 204 includes determining respective current faulty code change scores representative of the likelihood that the code change resulted in the test case failure. In one embodiment, determine likely faulty code change sub-module 204 includes a collect historical code change data sub-module 206 to collect historical code change test and fault-detect data, and to obtain historical code change scores for relevance of code changes to one or more test case failures. In addition, in one or more embodiments, determine likely faulty code change sub-module 204 includes a merge code change scores sub-module 208 to, for instance, merge the current faulty code change scores (obtained with reference to the current test results) and historical-based faulty code change scores to obtain respective merged scores. In addition, determine likely faulty code change sub-module 204 includes, in one or more embodiments, a rank code changes sub-module 210 to, for instance, rank potential faulty code changes based on the merged scores, which indicate relevance to one or more test case failures resulting from the testing of the merged code. Note that in one or more aspects, a faulty code change can be a bad code change that results in one or more test case failures when merged into the code base.

In one or more embodiments, self-tuning merged code test module 200 further includes a refresh testing environment sub-module 212 to, for instance, self-tune or customize, based on one or more determined likely faulty code changes, the suite of test cases to facilitate verifying that the likely faulty code change(s) is a true faulty code change, and to continue testing of the merged code using the customized suite of test cases to facilitate verifying that the likely faulty code change is in fact the faulty code change resulting in the test case failure. In one or more embodiments, self-tuning merged code test module 200 further includes a mine functional relationships sub-module 214 to mine functional relationships and shared test suites between different change code modules of the code change(s) during the code merge process, for instance, using one or more association rules.

Advantageously, the self-tuning merged code test module and process disclosed herein facilitate processing within a computing environment by providing enhancements to test code processing, including, for instance, automatically identifying one or more faulty code changes in merged code under test. The self-tuning merged code test processing disclosed relates code merge processing and test case failure(s) to facilitate merged code testing. In one or more embodiments, the conventional failure analysis approach is further enhanced by parsing and categorizing code change data and test information into groups exhibiting the same or similar symptoms to facilitate conserving diagnostic efforts. Substantial diagnosing cost savings and workflow enhancement efficiencies are obtained through intelligent analysis of code changes and test information to more quickly identify likely faulty code changes, and to verify that a particular code change is faulty when merged into the software base code. In this manner, developer efforts are conserved, and testing iterations are expedited, such as during a DevOps process. The self-tuning merged code test processing disclosed can greatly benefit continuous optimization deployment of program code, particularly of large commercial program code. Note that although various sub-modules are described, self-tuning merged code test module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present disclosure, to perform self-tuning merged code test processing. FIG. 3 depicts one example of a self-tuning merged code test workflow, such as disclosed herein. The method is executed, in one or more examples, by a computer (e.g., computer 101 (FIG. 1)), and/or a processor or processing circuitry (e.g., of processor set 110 of FIG. 1). In one example, code or instructions implementing the method, are part of a module, such as self-tuning merged code test module 200. In other examples, the code can be included in one or more other modules and/or in one or more sub-modules of the one or more other modules. Various options are available.

As one example, self-tuning merged code test process 300 executing on a computer (e.g., computer 101 of FIG. 1), a processor (e.g., a processor of processor set 110 of FIG. 1), and/or processing circuitry (e.g., processing circuitry of processor set 110), collects current merged code test data 302. In one or more embodiments, this can include testing merged code using a suite of test cases, where the merged code includes one or more code changes, and based on the testing, obtaining a test case failure (or multiple test case failures) using the suite of test cases.

In one or more embodiments, self-tuning merged code test process 300 further determines, using an artificial intelligence engine, a likely faulty code change of the one or more code changes resulting in the test case failure 304. In the embodiment illustrated, this can include scoring current code changes 306 for relevance to the test case failure (or relevance to multiple test case failures in the case of more than one test case failure) and collecting historical code change test and detect data, and obtaining historical code change scores 308. In addition, determining the likely faulty code change 304 includes, in one or more embodiments, merging respective current code change scores and historical code change scores 310 into merged scores. In one embodiment, a merged score is obtained by merging the current faulty code change score determined for a code change and particular test case failure, with the respective historical faulty code change score for the same or similar code change obtained from historical testing of code changes and historical faulty code change data. In addition, determining the likely faulty code change 304 includes, in one or more embodiments, ranking the code changes using the merged code change scores to indicate relevance between the particular code change and the test case failure to identify one or more most likely faulty code changes resulting in the test case failure 312.

In one or more embodiments, self-tuning merged code test process 300 further includes refreshing the testing environment using, for instance, the ranked code changes to facilitate verifying a particular faulty code change 314. For instance, in one or more embodiments, refreshing the testing environment includes self-tuning or customizing, based on the likely faulty code change, the suite of test cases to facilitate verifying that the likely faulty code change is a true faulty code change, and continuing testing of the merged code using the customized suite of test cases to facilitate verifying that the likely faulty code change is the true faulty code change.

In one or more embodiments, self-tuning merged code test process 300 further includes mining functional relationships and shared test suites between different code modules of the code changes, for instance, during code merge processing 316. In one or more embodiments, association rules are used to mine functional relationships and shared test suites between different code modules of the one or more code changes, where customizing of the suite of test cases is further based, at least in part, on the functional relationships and the shared test suites between the different code modules of the one or more code changes of the merged code. As described herein, in one or more embodiments, the code modules can be fine-grained code module groups rather than higher-level code components, such as database function components, where each code module group can include one or more code modules of the respective function component. For instance, in a relational database service, code components can include parser code, query transformation code, access path selection code, and runtime execution code, each of which can be further divided into code modules, as discussed herein. Similar fine-grain division of the code into modules or module groups can be performed, for instance, for other software components, such as the data engine component, buffer pool component, etc.

As noted initially, a development and operational (DevOps) computing environment is a combination of development and operation systems. A DevOps implementation optimizes communication, collaboration and integration between development and operation systems. By automating software delivery and architecture change processes, DevOps makes building, testing and releasing software faster, more frequent, and more reliable.

Merging code allows for code changes to be integrated into a code base. As a code base or software system grows increasingly sophisticated, testing, such as regression testing, of the merged code can yield one or more test case failures, for instance, on a daily basis. Each test case failure is conventionally analyzed individually by a test engineer to isolate the root cause of the failure. When a failure is detected in a merged code library, the exact code change resulting in the test case failure needs to be precisely identified to avoid implicating other code changes incorrectly. By scrutinizing the test case failure data and the code change information, a faulty code change can be located.

The DevOps lifecycle, sometimes referred to as a continuous delivery pipeline, is a series of iterative, automated development processes, or workflows, executed within a larger, automated and iterative development lifecycle designed to optimize the rapid delivery of high quality software. Continuous optimization deployment, which is a requirement for certain large scale commercial software, demands test-driven and rapid development, as stipulated in the continuous integration, delivery and deployment framework (CI/CD). Within this framework, new code (i.e., one or more code changes) is integrated into the existing code base, and then tested and packaged into an executable for deployment. Automated activities can include merging code changes into a master copy, checking out that code from a source code repository, and automating the compile, and unit test, and packaging into an executable. Classical DevOps lifecycles include a discrete "test" phase that occurs between integration and deployment. In current DevOps automated processing, developers frequently have to install an intricate test environment including numerous software services, which can take an extended period of time. The total duration for a single automated test can last a number of days, even though certain test cases may be irrelevant to any minor incoming code change.

In one or more implementations, disclosed herein are computer-implemented methods, computer systems and computer program products that include program code with self-tuning merged code testing, such as described herein, for instance, in connection with FIGS. 1-3. Advantageously, the self-tuning merged code test processing disclosed automatically refreshes, in part, test case execution for incoming merged code with one or more code changes during the integration/execution phase. The processing disclosed conserves developer efforts and speeds up iteration of the DevOps regressing testing process. In one or more embodiments, the self-tuning merged code test process disclosed can be implemented as a self-tuning code fix merge and integration process during DevOps processing. Advantageously, the self-tuning merged code test process uses multiple factors to simplify the classification of code changes during the merge process. In addition, the self-tuning merge code test process discovers underlying logic (i.e., the modules) of the incoming code changes, and builds internal relationships between different code or module groups, to then obtain different frequent item sets of the test suites for different module groups (derived from the code changes (e.g., code fixes)). In addition, the self-tuning merged code test process disclosed herein, in one or more embodiments, parses and categorizes failure information (test case failures) into groups exhibiting the same symptoms to streamline the data processing to identify and verify a faulty code change. In one or more embodiments, an artificial intelligence engine is used to leverage failure information intelligently to identify suspicious defective code changes (e.g., suspicious defective code fixes). In accordance with one or more embodiments, the self-tuning merged code test process disclosed recognizes and provides failing code change test results and detects and records code change defects throughout the code merge process (in one or more embodiments). In accordance with one or more aspects of the present invention, the process for merging code changes into a code base is integrated with a test case failure tuning process such as disclosed to, for instance, efficiently identify one or more faulty code changes in the resultant merged code.

Figure 4:
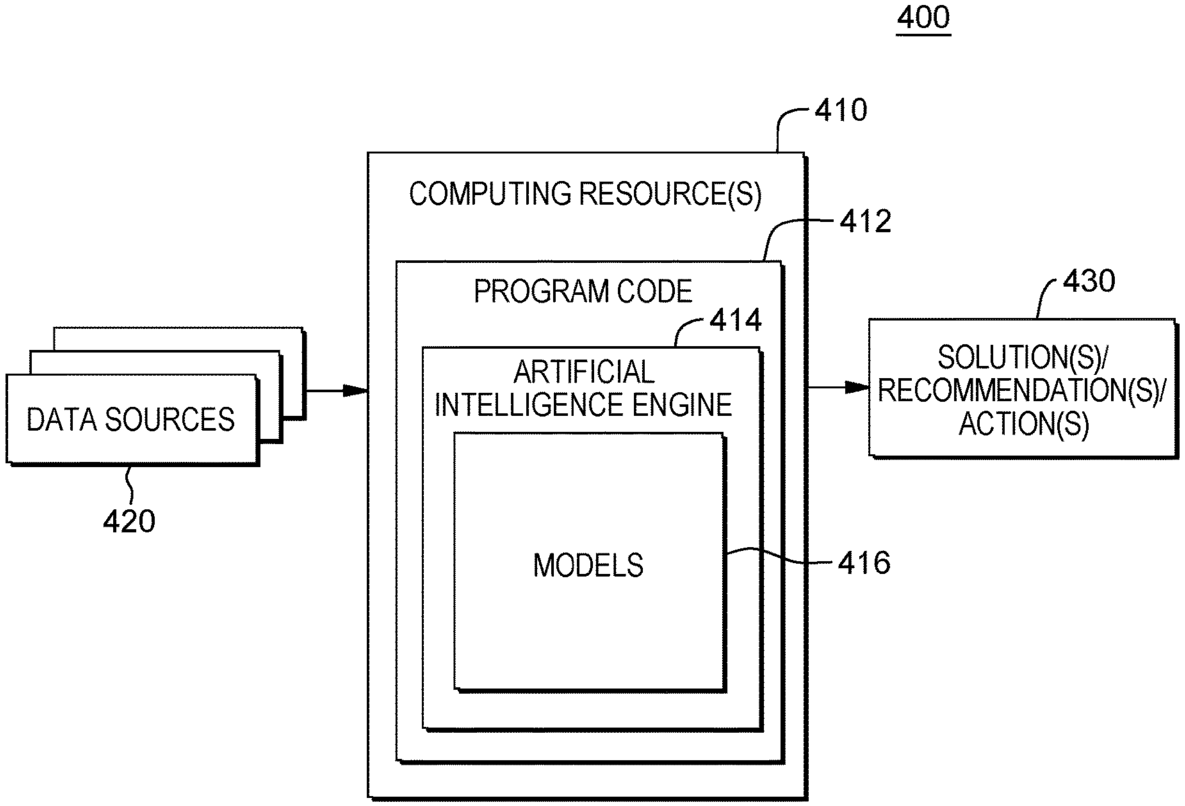
FIG. 4 is a further example of a computing environment to include and/or use one or more aspects of the present disclosure.

By way of further explanation, FIG. 4 depicts another embodiment of a computing environment or system 400, which can incorporate, or implement, one or more aspects of an embodiment of the present invention. In one or more implementations, system 400 is implemented as part of a computing environment, such as computing environment 100 described above in connection with FIG. 1. System 400 includes one or more computing resources 410 that execute program code 412 that implements, for instance, one or more aspects of a module or facility such as disclosed herein, and which includes an artificial intelligence engine or agent 414, which utilizes one or more models 416 (e.g., one or more machine learning models), such as described herein. Data, such as code change data, test case failure data, and historical code change and test data, as well as other data discussed herein, is used by artificial intelligence engine 414, to train models 416 to (for instance) determine a likely faulty code change of one or more code changes relevant to a test case failure, as well as to, for instance, analyze historical failure data to facilitate generating failure symptom groups, generate and/or obtain code change scores for both current test data and historical test data indicative of relevance of a particular code change to one or more test case failures, as well as to self-tune or customize test case suites to facilitate verifying that a likely faulty code change is a true faulty code change, and/or other related actions 430, etc., based on the particular application of the model(s) to facilitate achieving one or more aspects of the workflow disclosed. In implementation, system 400 can include, or utilize, one or more networks for interfacing various aspects of computing resource(s) 410, as well as one or more data sources 420 providing data, and one or more components, systems, etc., receiving an output, action, etc., 430 of models 416. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model, such as discussed herein.

In one or more implementations, computing resource(s) 410 house and/or execute program code 412 configured to perform methods in accordance with one or more aspects of the present invention. By way of example, computing resource(s) 410 can be a computing-system-implemented resource(s). Further, for illustrative purposes only, computing resource(s) 410 in FIG. 4 is depicted as being a single computing resource. This is a non-limiting example of an implementation. In one or more other implementations, computing resource(s) 410, by which one or more aspects of self-tuning merged code test processing, such as discussed herein, can, at least in part, be implemented in multiple separate computing resources or systems, such as one or more computing resources of a cloud-hosting environment, by way of example.

Briefly described, in one embodiment, computing resource(s) 410 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one embodiment, program code 412 executes artificial intelligence engine 414 which includes and trains one or more models 416. The models can be trained using training data that can include a variety of types of data, depending on the model and the data sources. In one or more embodiments, program code 412 executing on one or more computing resources 410 applies one or more algorithms of artificial intelligence engine 414 to generate and train the model(s), which the program code then utilizes to determine or predict a likely faulty code change of one or more code changes relevant to a test case failure, as well as to, for instance, analyze test case failures and historical failure data to facilitate generating failure symptom groups, to generate and/or obtain code change scores for both current test data and historical test data indicative of relevance of a particular code change to one or more test case failures, as well as to self-tune or customize the suite of test cases to facilitate verifying that a likely faulty code change is a true faulty code change, etc., and depending on the application, to perform an action (e.g., automatically self-tune the suite of test cases, make a recommendation, issue an alert, etc.). In an initialization or learning stage, program code 412 trains one or more models 416 using obtained training data that can include, in one or more embodiments, code change data, test case data, historical data, etc., such as described herein.

Data used to train the models (in one or more embodiments of the present invention) can include a variety of types of data, such as heterogeneous data generated by one or more data sources and/or data stored in one or more logs, or accessible by, the computing resource(s). Program code, in embodiments of the present invention, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying model(s) 416, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present invention, the program code can utilize a neural network to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

Figure 5:
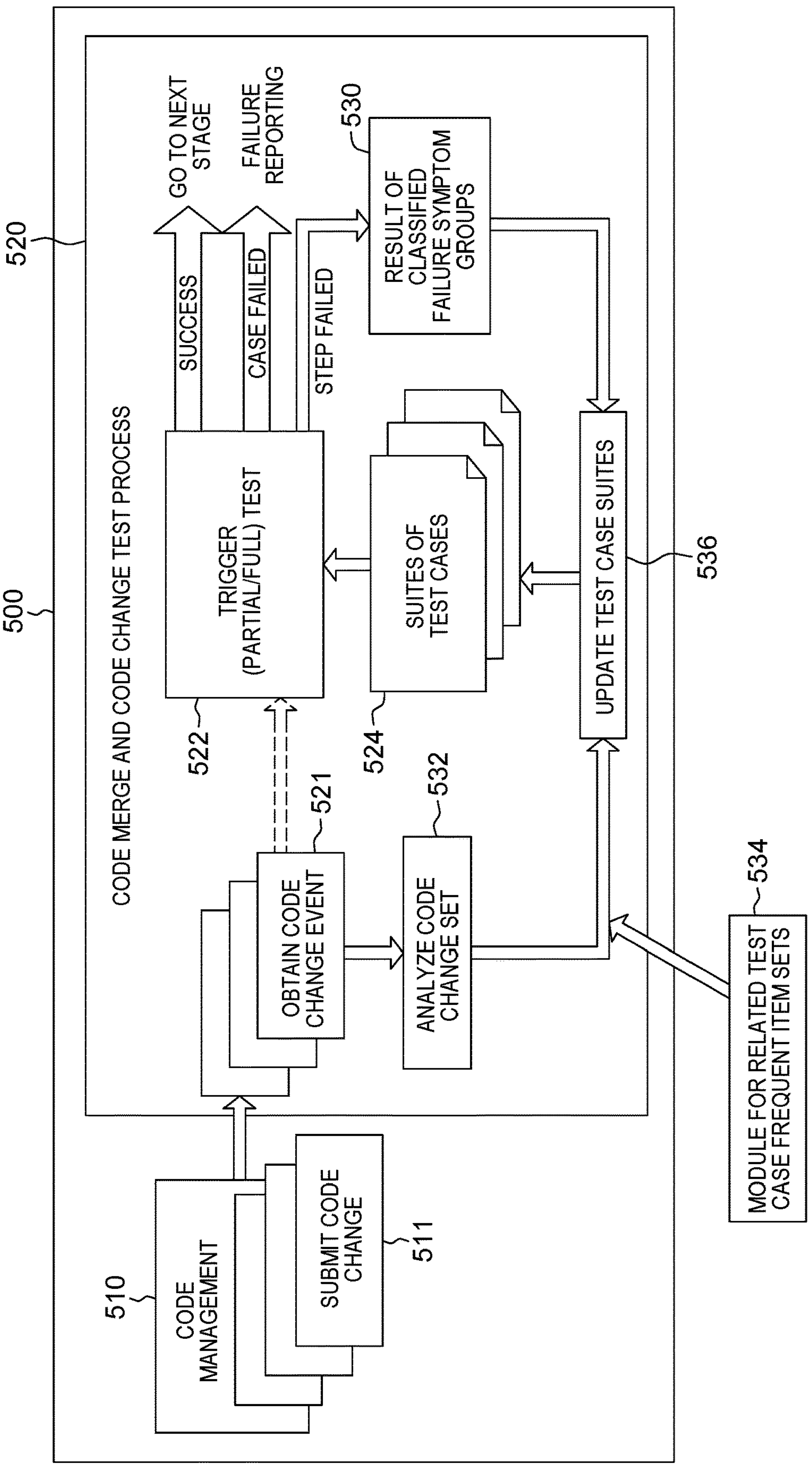
FIG. 5 depicts one embodiment of a code merge and code change test process, in accordance with one or more aspects of the present disclosure.

By way of example, FIG. 5 depicts a further embodiment of a computing environment workflow 500, such as a DevOps environment, with code merge and merged code test processing 520, in accordance with one or more aspects of the present disclosure. In one or more embodiments, computing environment 500 is part of, or implemented as part of, a computing environment, such as computing environment 100 described above in connection with FIG. 1, and/or computing environment 400 described above in connection with FIG. 4.

In the illustrated workflow of FIG. 5, code management 510, such as source code management, submits one or more code changes 511 to self-tuning code merge and test processing 520. Self-tuning code merge and test processing 520 obtains the one or more code change events 521, and triggers testing of the merged code with the one or more code changes 522 using one or more suites of test cases 524. The testing is either successful, in which case processing proceeds to the next stage, such as the next stage of the DevOps process, or the testing fails based on one or more test cases of the suite of test cases failing, in which case a failure report can issue. Typically, failure investigation is a lengthy process involving regression testing and manual input. The investigation process can take a significant period of time during which, for instance, one or more code changes may be waiting to enter into regression testing. In one embodiment, if x number of test cases are run and generate y test case failure outputs, then the regression tester typically manually reads and analyzes the failure symptom information to locate suspicious faulty code changes, and then verify a particular defective code change using, regression testing, which can extend over a number of days, depending on the software code and suite of test cases.

As noted, in accordance with one or more aspects disclosed herein, computer-implemented methods, computer systems and computer program products are provided for facilitating, in part, regression testing of merged code, such as in the development and operational (DevOps) computing environment. In accordance with one or more aspects disclosed herein, the test case failures can be classified into failure symptom groups 530 and then used by an update test case suites facility 536 to, for instance, determine a likely faulty code change of multiple code changes resulting in the test case failure. The update test case suites facility 536 further self-tunes or customizes, based on the likely faulty code change, the suite of test cases to facilitate further testing and verifying that the likely faulty code change is a true faulty code change. In addition, updating the test case suites 536 utilizes (in one or more embodiments) an analysis of the code change set 532 to obtain code change data, as well as referencing module data for related test case frequent item sets 534 to, for instance, facilitate evaluating the code changes at a more fine-grained module or module group level, such as disclosed herein.

In one or more embodiments, the self-tuning merged code process of FIG. 5 includes testing merged code using a suite of test cases, where the merged code includes one or more code changes, and obtaining, based on the testing, one or more test case failures using the suite of test cases. Further, the process includes, in one or more embodiments, determining, using an artificial intelligence engine, a likely faulty code change of the one or more code changes resulting in the test case failure, and customizing based on the likely faulty code change, the suite of test cases to facilitate verifying that the likely faulty code change is a true faulty code change. Processing continues with testing of the merged code using the customized suite of test cases to facilitate verifying that the likely faulty code change is the true faulty code change. Advantageously, by self-tuning or customizing the suite of test cases automatically, for instance, to reduce the number of test cases, significant regression testing time is saved in that the testing cases are customized, in one or more embodiments, to verifying that the likely faulty code change is the true faulty code change, which greatly reduces the regression testing time.

Figure 6:
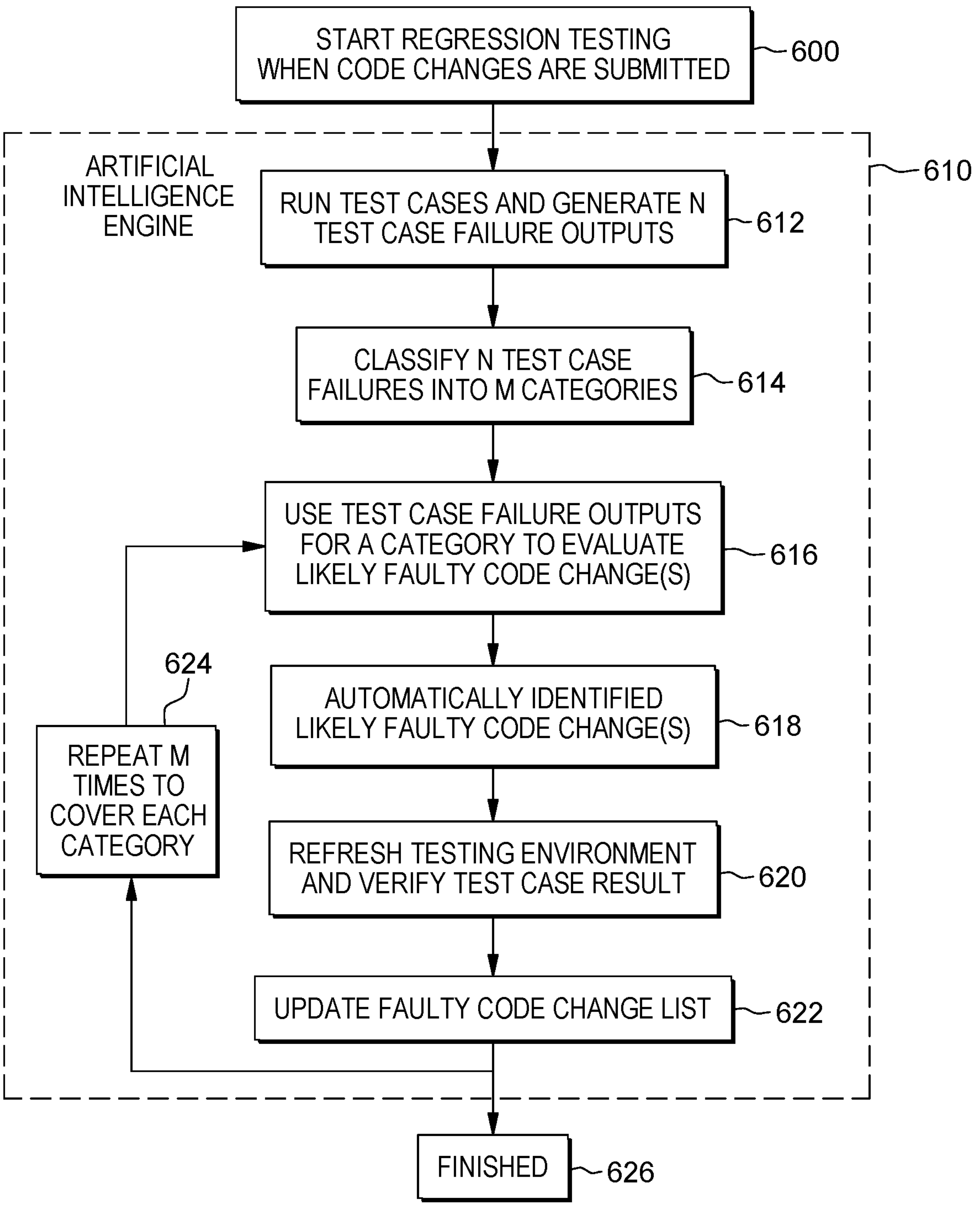
FIG. 6 depicts another embodiment of a self-tuning merged code test workflow, in accordance with one or more aspects of the present disclosure.

As a further example, FIG. 6 depicts a more detailed embodiment of a self-tuning merged code test workflow, in accordance with one or more aspects of the present disclosure. In this workflow, regression testing starts when code changes are submitted 600, for instance, as part of the merged code facility. Merged code testing using a suite of test cases is performed, where the merged code includes one or more code changes, and N test case failure outputs are generated 612. In the embodiment illustrated, an artificial intelligence engine 610 facilitates one or more aspects of the processing described including, for instance, classifying the resultant N test case failures into M categories, where N>M 614. For instance, in one or more embodiments, the number of categories may be a fraction of the number of failing test cases, such as one halve or less than the number of failing test cases, as one example. For each classification, artificial intelligence engine 610 uses the respective test case failure outputs in identifying a likely faulty code change resulting in a particular test case failure(s) 616, and automatically scores code changes for relevance to the particular test case failures to facilitate identifying a likely faulty code change 618. The testing environment is refreshed, and the test case result is verified 620. In one or more embodiments, this can include, for instance, customizing, based on the likely faulty code change, the suite of test cases to facilitate further testing of the likely faulty code change, and continuing testing of the merged code using the customized suite of test cases. In one or more other embodiments, refreshing the testing environment and verifying the test case result can alternatively include backing out the likely faulty code change from the merged code and repeating the testing of the merged code using the suite of test cases to verify successful execution of the previously failing test case. Once identified, the faulty code change is added to a faulty code change list 622, and the process repeats M times to cover each test case failure category of the M categories 624, before finishing 626. Advantageously, basing the regression testing on the classifications of the test case failures results in a smaller number of regression tests compared with conventional regression testing used in evaluating the test case failures separately.

Figure 7:
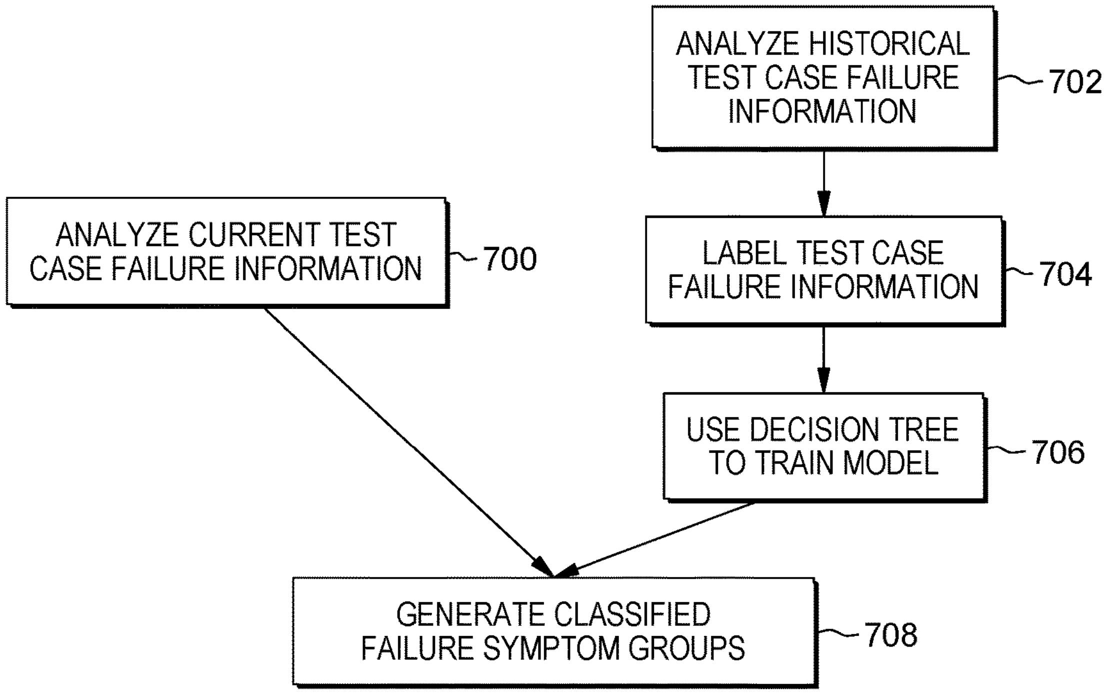
FIG. 7 depicts one embodiment of a workflow for classifying test case failures into test case failure symptom groups, in accordance with one or more aspects of the present disclosure.

As noted, in one or more embodiments, self-tuning merged code test processing is facilitated herein by, in part, analyzing and classifying failure information into same-symptom groups to simplify the amount of data processing, and thereby speed up the code change test and correction process. FIG. 7 depicts one embodiment for classifying test case failures into categories or classes of failure symptom groups. As illustrated, in one embodiment, the artificial intelligence engine obtains and analyzes current test case failure information 700, and analyzes historical test case failure information 702. Analysis of the historical test case information is facilitated by, for instance, labeling the test case failure information 704, which in one or more embodiments, can be obtained from an historical knowledge database. Further, the artificial intelligence engine uses, in one embodiment, a decision tree to train a model 706 to facilitate generating the failure symptom groups 708 from the current test case failure information 700.

As noted, in one or more embodiments, the self-tuning merged code test processing disclosed determines, via the artificial intelligence engine, a likely faulty code change, using, for instance, the classified failure symptom groups or categories as described above in connection with FIGS. 6-7. This process includes, in one or more embodiments, obtaining respective merge code change scores and proving a ranked list based on the merged code change scores of code changes potentially causing a particular test case failure, or class of test case failures. One embodiment of the workflow is depicted in FIG. 8.

Figure 8:
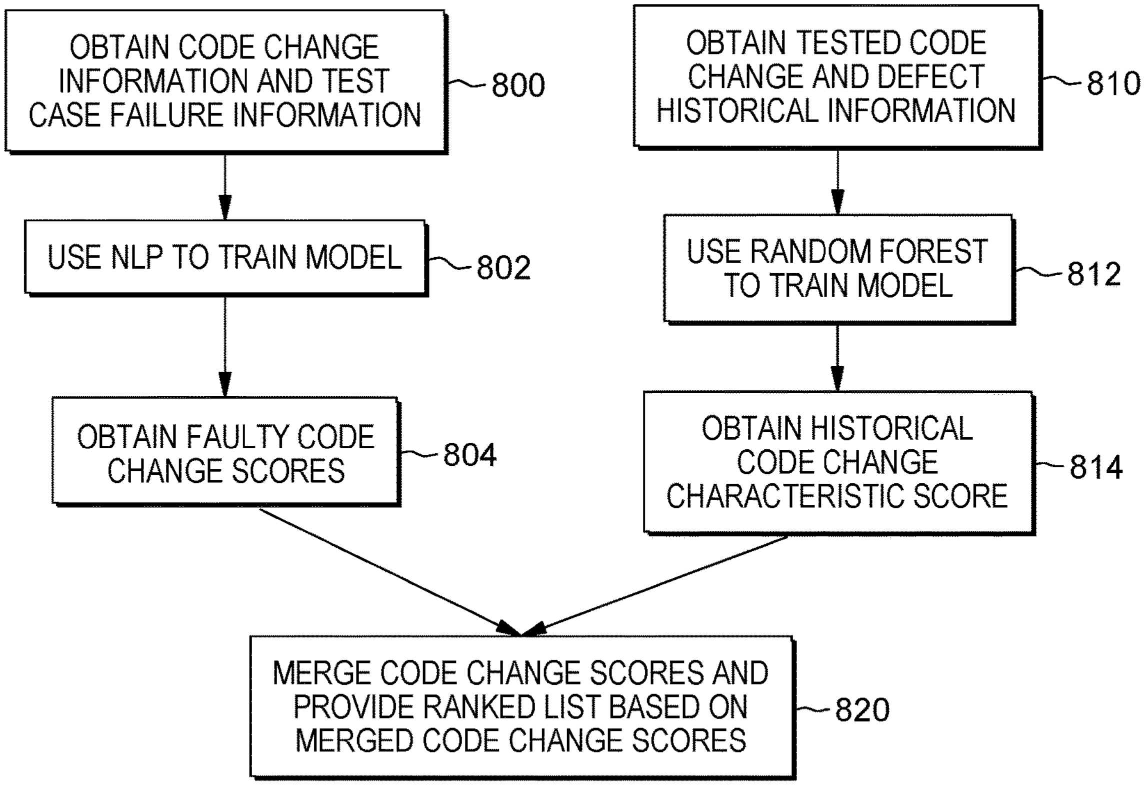
FIG. 8 depicts one embodiment of a workflow for merging current and historical faulty code change scores to obtain merged code change scores and a ranked list of potential faulty code changes resulting in a test case failure, in accordance with one or more aspects of the present disclosure.

As illustrated in FIG. 8, in one embodiment, the artificial intelligence engine obtains code change information and test case failure information 800, and uses, for instance, natural language processing (NLP) to train a model 802 to facilitate generating faulty code change scores 804, which are current faulty code change scores based on the obtained code change information and current test case failure information 800. In addition, the artificial intelligence engine obtains, in one embodiment, tested code changes and defect historical information 810 and using, for instance, a random forest approach, trains another machine learning model 812 to facilitate obtaining historical code change characteristic scores 814 for each code change under test. The artificial intelligence engine combines or merges the code change scores, in one embodiment, and provides a ranked list based on the merged code change scores of likely code changes producing the test case failure(s) 820. Note that the combining or merging of test scores can be performed using a specified function. One example of this is depicted in FIG. 9.

Figure 9:
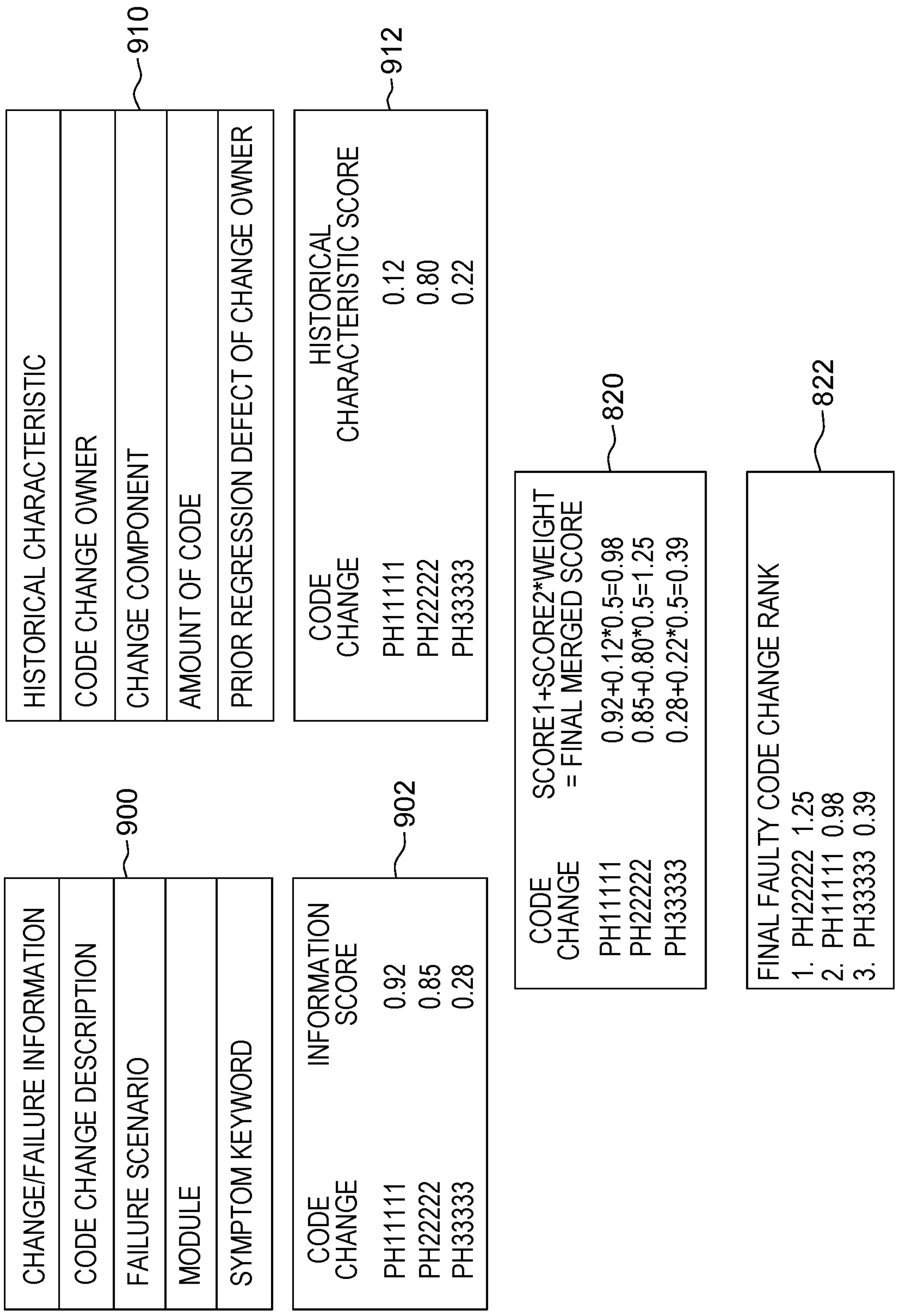
FIG. 9 depicts one example of a ranking of merged code change scores, in accordance with one or more aspects of the present disclosure.

Referring to FIG. 9, one example of determining merged code change scores 820 and providing a ranked list 822 is depicted. In the example provided, change/failure information for, for instance, three code changes or code fixes (PH11111, PH22222, PH33333) 900 is obtained including, for instance, a code change or code fix description, a test failure scenario, one or more modules or groups of modules analyzed, and one or more symptom group keywords 900. Using this information and, for instance, the trained model 802 (see FIG. 8), the artificial intelligence engine generates a code change information score, or current faulty code change score 902 for each code change. In addition, the artificial intelligence engine obtains historical characteristic information data 910 including, for instance, a code change owner, a code change component, an amount of code in the code change, prior regression defect of the code change owner, etc., 910, and the artificial intelligence model 812 (FIG. 8) is used to generate on historical code change characteristic score 912 for each code change being evaluated. The artificial intelligence engine merges or combines the respective current faulty code change score 902 and historical characteristic code change score 912 using, for instance, a specified function, such as illustrated in FIG. 9, where the current faulty code change score is summed with the corresponding historical characteristic code change score multiplied by a specified weight, such as 0.5, in one example only, to arrive at the resultant merged scores 820. The resultant merged scores 820 are then used to generate the ranked list 822 of code changes potentially resulting in the respective test case failure(s).

As noted, once the code changes potentially resulting in the test case failure(s) have been ranked using the scores, then the self-tuning merged code test process further includes refreshing the testing environment to verify the test case result. For instance, in one embodiment, when a test case failure occurs, the artificial intelligence engine re-runs and diagnosis the failed test case on every code change to identify the true faulty code change resulting in the failure. Diagnosing time is saved during this process by, in part, reducing successful test case execution time. For instance, in one or more embodiments, the refresh testing environment process includes customizing, based on the likely faulty code change, the suite of test cases to facilitate verifying that the likely faulty code change is a faulty code change. In one embodiment, this can include, for instance, removing one or more test cases from the suite of test cases irrelevant to testing the faulty code change to tailor the suite of test cases to facilitate verifying the faulty code change. Advantageously, the processing described herein intelligently uses test case failure information to identify a likely faulty code change (e.g., a bad code fix), and to identify and verify the faulty code change testing results. One embodiment of this is depicted in FIG. 10A, which illustrates change of a DevOps environment during failure case analysis, in accordance with one or more aspects disclosed herein.

Figure 10A:
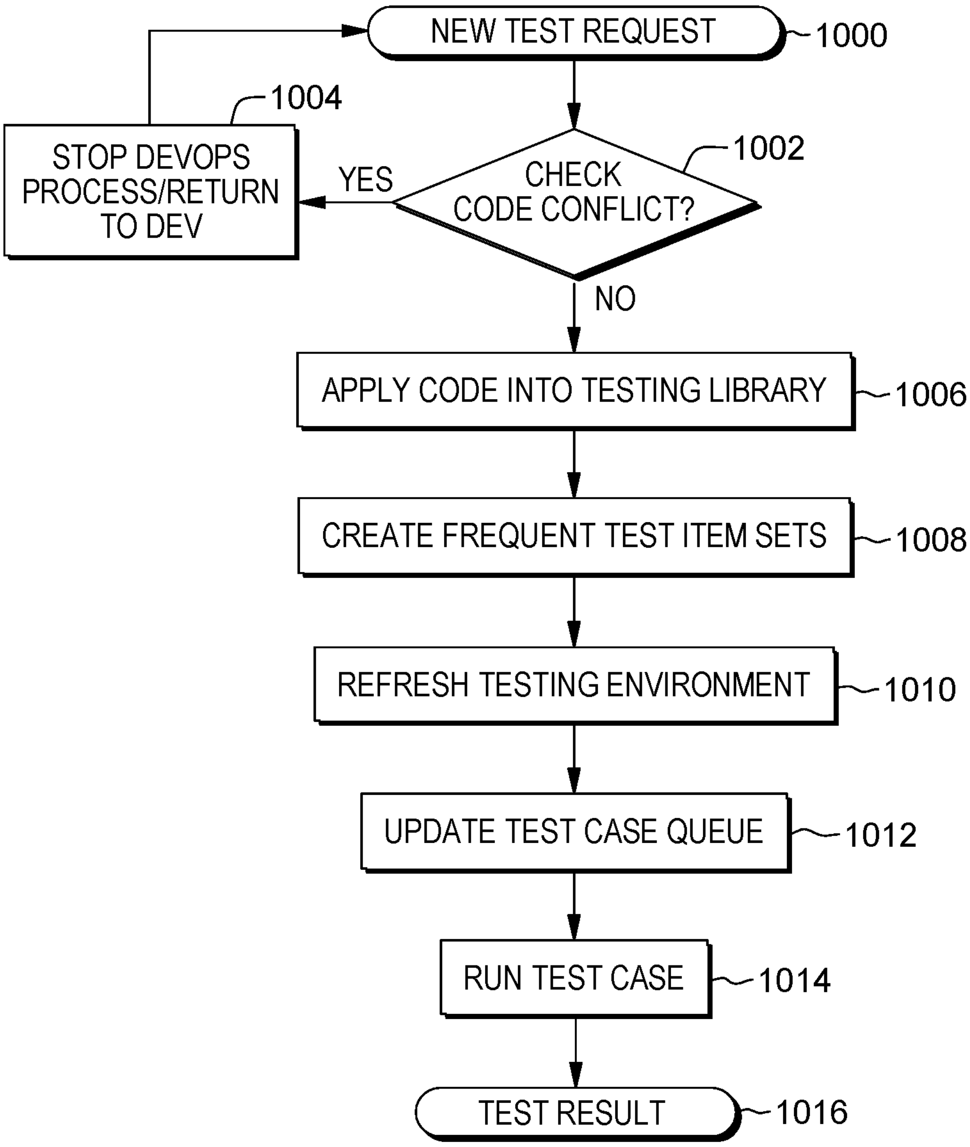
FIG. 10A depicts one embodiment of a refresh testing environment workflow, in accordance with one or more aspects of the present disclosure.
Figure 10B:
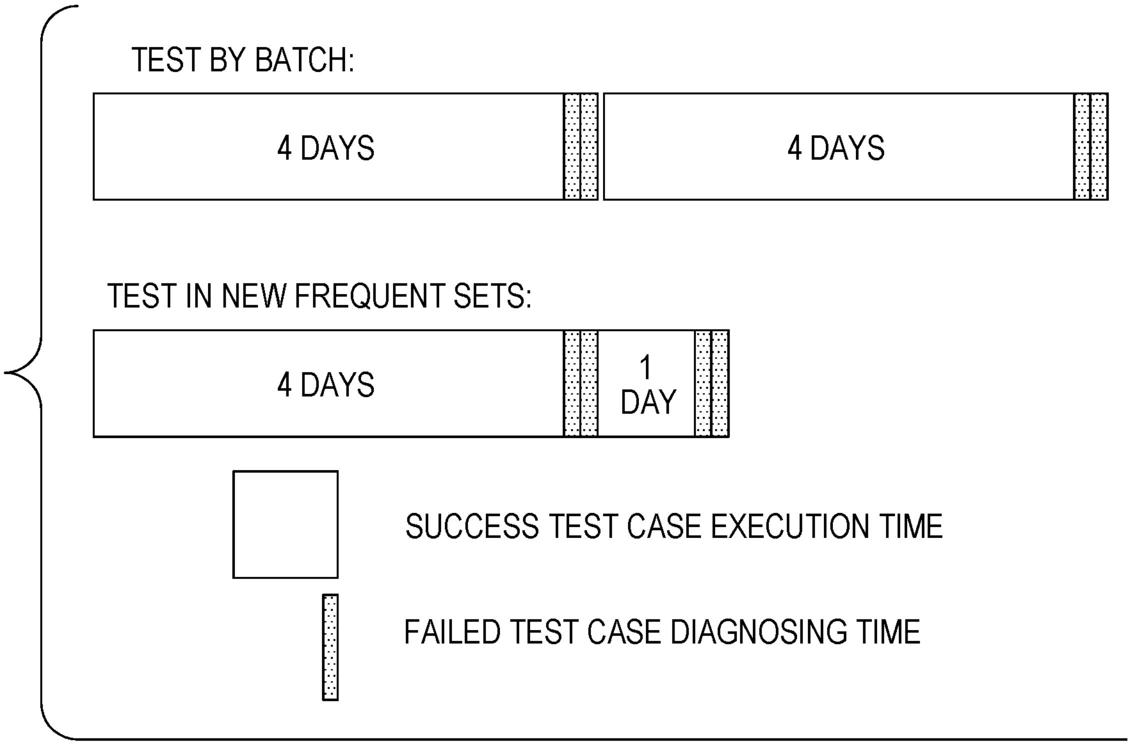
FIG. 10B illustrates a reduction in merged code testing time using self-tuning merged code test processing, in accordance with one or more aspects of the present disclosure.

In the embodiment of FIG. 10A, the code change test process receives a new test request 1000, and processing initially determines if there is a code conflict 1002, and if so, stops the DevOps process and returns to the development stage for further development of the code 1004. Assuming that there is no code conflict, then the code change is applied into the testing library 1006, and frequent test item sets are created 1008, one embodiment of which is described further below with reference to FIGS. 11A-12. The process further includes refreshing the testing environment 1010, as noted herein, updating the test case queue 1012, and then running the test cases 1014 to obtain the test case results 1016. By refreshing the testing environment, for instance, customizing or tailoring the testing environment, as described herein, the amount of time required to test the merged code is reduced, for instance, by removing one or more test cases from the suite of test cases used in testing the merged code deemed irrelevant to evaluating the changed code with reference to the one or more failed test cases. An example of this is depicted in FIG. 10B, where the successful test execution time for testing the merged code is reduced in comparison to conventional batch-testing of the merged code.

Figure 11B:
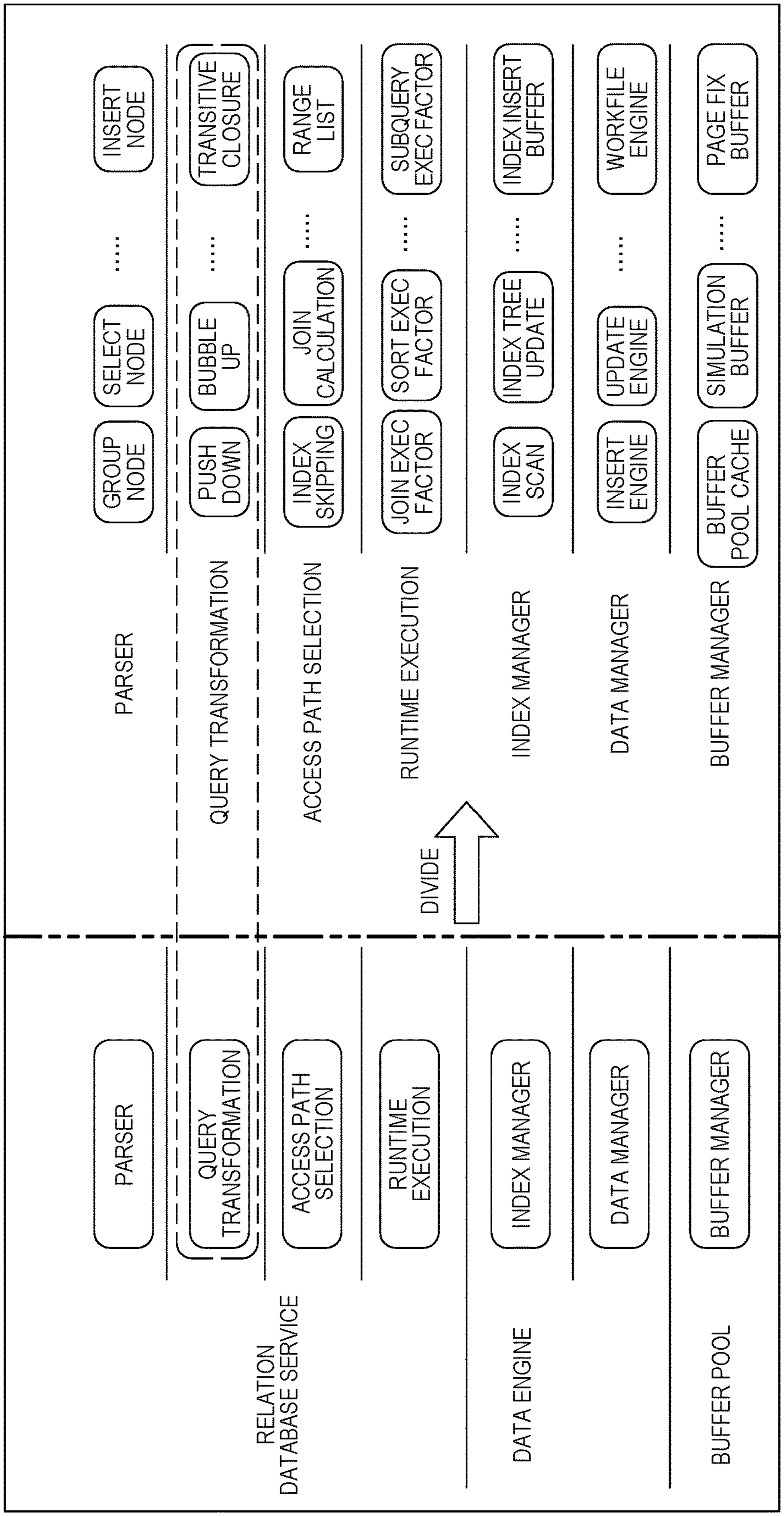
Figure 11C:
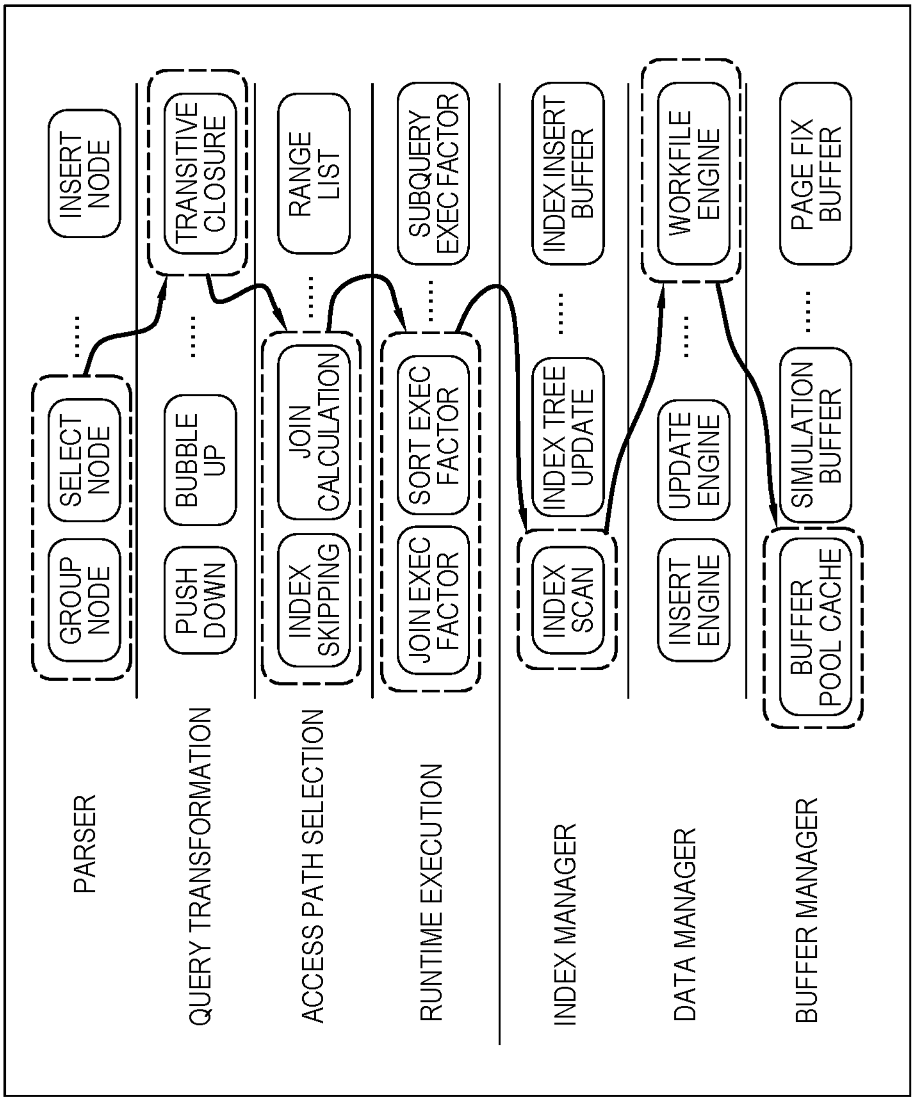

As noted, FIGS. 11A-11C illustrate one embodiment of classifying of changes in merged code under test based on database function module groups of the code change(s). As illustrated in FIG. 11A, code, such as a database code, will have a number of components associated with the code. In the example illustrated, the code includes a database service, which has a buffer pool component, an engine component, a read component, etc.; a database function which has a parser component, optimizer component, runtime component, transformation component, etc.; a test case query organization, which has a verb component, list fields component, predicate component, function component, etc.; and an effective modules query used, which includes a select component, group component, having component, join component, etc. In FIG. 11B, certain example components are further divided into multiple parts based on database functions (again in the example presented). The different parts are different modules.

FIG. 11B illustrates a sample of how to split and correspond one test case structured query language (SQL) statement of a relational database service into different fine-grained hierarchies of the corresponding database implementation modules. For instance, the parser component can be further divided into a group node module, a select node module, an insert node module, etc., the query transformation component can be divided into a push-down module, bubble-up module, transitive closure module, etc., the access pass selection component can be divided into an index skipping module, a join calculation module, a range list module, etc., and the runtime execution component can be divided into a join execution factor module, a sort execution factor module, a sub-query execution factor module, etc. Similar modules can be divided out from the other components illustrated in FIG. 11B, as shown.

In FIG. 11C, selected modules can be grouped based on the respective code (e.g., respective code change). In a specific example, an example code might include:

```
SELECT T1.C1
FROM T1, T2,
WHERE T1.C2 = T2.C2
  AND T2.C2 = 1
GROUP BY T1.C1
```

When the sample query code runs in the database engine, in each component, it will use the specific modules which (in one embodiment) group, as indicated by the dotted lines of FIG. 11C. As noted, in this example a module group can have a single module, or multiple modules, depending on the code.

In one or more aspects, the identified modules can be used in building association rules for code-module relationships. For instance, association rules can be built to mine functional relationships and shared test suites between different code modules of the code changes for, or during, a code merge process. The process can build internal relationships between different code module groups, and obtain different frequent item sets of test suites for different module groups.

Figure 12:
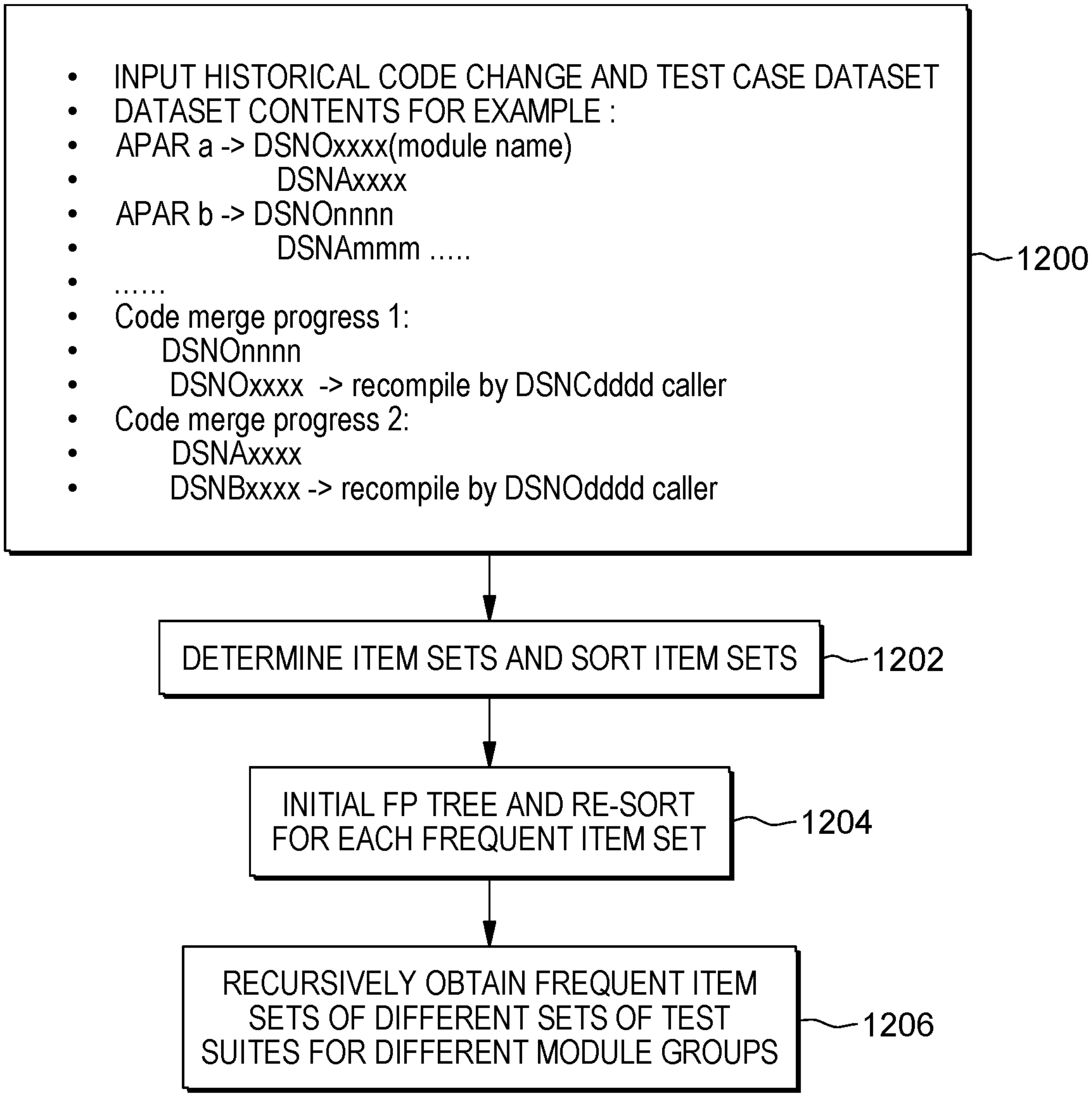
FIG. 12 depicts one embodiment for mining functional relationships between module groups of the merged code, in accordance with one or more aspects of the present disclosure.

One embodiment of the process is outlined in FIG. 12, where, for instance, historical input code change and test case data or dataset 1200 is obtained, with the dataset identifying different code changes (e.g., different fix code changes (Authorized Program Analysis Report (APAR)) module names (e.g., DSNOxxxx, DSNAxxxx, DSNOnnnn, DSNAmmm). The information can further include different code merge progresses of the different modules of the code changes, an example of which is depicted in FIG. 12. Processing determines item sets and sorts the item sets 1202. An initial frequent pattern (FP) tree can be provided using the FP growth algorithm, and applied, and the item sets can be resorted for each frequent item set 1204. For instance, in the example of FIG. 12, APAR a includes module changes in DSNOxxxx, DSNAxxxx, etc., and APAR b includes module changes in DSNOnnnn and DSNAmmm, etc. Code merge progress 1 includes merged code with DSNOnnnn and DSNOxxxx, which is recompiled by a DSNCdddd caller, so DSNCdddd, etc., is added. Similarly, code merge progress 2 includes module changes in DSNAxxxx, DSNBxxxx, etc., which is recompiled by a DSNOdddd caller, and so DSNOdddd, etc., is added. An FP tree and node linked list can be built with the noted APAR code merge modules and code item set using the general FP tree build process. The frequent item sets can then be used in recursively obtaining frequent item sets can then be used in recursively obtaining frequent item sets of different sets of test suites for different module groups 1206.

By way of further example, FIG. 13 depicts one detailed example of code change test mapping during a self-tuning merged code test process, such as described herein. As illustrated in FIG. 13, the mapping relationship of individual code changes and test case results is provided, with one row being for one code change test result, with the different code changes being designated by the Authorized Program Analysis Report (APAR) column including, for instance, how many successful test cases, how many failed test cases, how many test cases yet to run, etc. The testing process executes test cases on merged code changes (e.g., merged fix codes), and for the mapping relationship structure depicted, the testing result of each code change can be recorded. In this manner, the DevOps process can include or exclude any code change, and there is no need to stop the overall merged code testing, thereby significantly improving testing efficiency.

Those skilled in the art will note from the description provided herein that a self-tuning merged code testing process is provided, such as a self-tuning fixed merge and integration process for a DevOps environment. During the failure tuning process, the self-tuning merged code testing concludes gathering current change code information and present failure information for training a model using natural language processing, and then scoring code changes under test based on correlation to one or more test case failures. Further, the process includes aggregating historical code change information (e.g., fix code information) to analyze defective code change characteristics, and applying, in one embodiment, a random forest approach to assigning weighted scores for code changes under test. In one or more embodiments, the process further includes merging current change code scores and historical change code scores to obtain a merged, final score for each code change to be used in ranking suspicious defective code changes. In one or more embodiments, a cloud deployment approach can be used to facilitate isolating each suspicious code change (e.g., suspicious bad fix code) in the testing environment, according to the score rankings, where the implemented self-tuning process executes until proving that a particular code change is an actual faulty code change, and the defect for the actual faulty code change is reported. In one or more implementations, association rules can be used to mine functional relationships and shared test suites between different code modules during the code merge process. This facilitates correlating the code merge process with the self-tuning test process.

Advantageously, in one or more implementations, the self-tuning merged code testing disclosed substantially simplifies data analysis by parsing and categorizing fix and test information into groups exhibiting the same symptoms to conserve diagnosing processing. This facilitates realizing substantial diagnosing cost savings and enhancing work efficiency through intelligent analysis of code changes and test information, facilitating suspicious defective code change mining and recognition of proof of faulty code change. The approach greatly benefits a continuous optimization deployment of large-scale commercial software. Also, the test-driven and rapid deployment of code changes facilitate continuous integration, development and deployment processes.

The terminology used herein is for the purpose of describing particular embodiments only and is not intended to be limiting of the disclosure. As used herein, the singular forms “a”, “and” and “the” are intended to include the plural forms as well, unless the context clearly indicates otherwise. It will be further understood that the terms “comprise” (and any form of comprise, such as “comprises” and “comprising”), “have” (and any form of have, such as “has” and “having”), “include” (and any form of include, such as “includes” and “including”), and “contain” (and any form contain, such as “contains” and “containing”) are open-ended linking verbs. As a result, a method or device that “comprises”, “has”, “includes” or “contains” one or more steps or elements possesses those one or more steps or elements, but is not limited to possessing only those one or more steps or elements. Likewise, a step of a method or an element of a device that “comprises”, “has”, “includes” or “contains” one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of facilitating computing environment processing, the method comprising:

automatically self-tuning regression testing of executing merged code within a development and operational (DevOps) computing environment, the automatically self-tuning regression testing of executing merged code comprising:

executing the merged code using a suite of test cases to regression test the merged code, the merged code comprising multiple code changes;

obtaining, based on the executing of the merged code using the suite of test cases, a plurality of test case failures;

generating, using an artificial intelligence engine comprising a trained machine learning model, current faulty code change scores for the multiple code changes by analyzing current change code data for the multiple code changes and current test case failure information for the plurality of test case failures;

obtaining historical-based faulty code change scores for the multiple code changes using historical code change tests and historical fault code change data;

merging, for respective code changes of the multiple code changes, the current faulty code change scores and the historical-based faulty code change scores to obtain merged faulty code change scores;

ranking the multiple code changes based on the merged faulty code change scores to determine a likely faulty code change of the multiple code changes resulting in a test case failure of the plurality of test case failures;

identifying, based on the likely faulty code change determined from the ranking and based on relevance of test cases in the suite of test cases to the likely faulty code change, one or more test cases of the suite of test cases that are irrelevant to further testing the likely faulty code change, wherein the relevance of test cases in the suite of test cases to the likely faulty code change is determined based, at least in part, on functional relationships and shared test suites between code modules of the multiple code changes;

automatically customizing, based on the likely faulty code change, the suite of test cases by removing the identified one or more test cases from the suite of test cases irrelevant to further testing the likely faulty code change to generate a tailored test case set that facilitates verifying that the likely faulty code change is the faulty code change by reducing regression testing time while maintaining verification accuracy;

and continuing executing of the merged code within the development and operational (DevOps) computing environment using the tailored test case set to continue regression testing of the executing merged code to facilitate verifying that the likely faulty code change is the faulty code change.

2. The method of claim 1, wherein the the plurality of test case failures are classified into different test case failure classes, and wherein determining the likely faulty code change comprises using the test case failure classes to facilitate determining the likely faulty code change.

3. The method of claim 2, wherein classifying the plurality of test case failures comprises generating test case failure symptom groups based on data-analyzing the plurality of test case failures, and based on analyzing historical test case failure data, the test case failure symptom groups comprising groups of test cases exhibiting similar symptoms, wherein the test case failure symptom groups are the test case failure classes.

4. The method of claim 3, further comprising using a decision tree to train an artificial intelligence classify model based on the historical test case failure data to facilitate generating the test case failure symptom groups.

5. The method of claim 1, wherein the current faulty code change scores are generated for respective code changes of the multiple code changes based on relevance of the respective code changes to respective test case failure classes of the plurality of test case failures.

6. The method of claim 5, generating the current faulty code change scores comprises training the trained machine learning model using, at least in part, current change code data for the merged code and current test case failure information for the plurality of test case failures.

7. The method of claim 1, further comprising using association rules to mine the functional relationships and shared test suites the different code modules of the multiple code changes, wherein the association rules identify frequent item sets of the test suite for different code module groups of the multiple code changes.

8. A computer system for facilitating computing environment processing, the computer system comprising:

a memory; and at least one processor in communication with the memory, wherein the computer system is configured to perform a method, the method comprising:

automatically self-tuning regression testing of executing merged code within a development and operational (DevOps) computing environment, the automatically self-tuning regression testing executing merged code comprising:

executing the merged code using a suite of test cases to regression test the merged code, the merged code comprising multiple code changes;

obtaining, based on the executing of the merged code using the suite of test cases, a plurality of test case failures;

generating, using an artificial intelligence engine comprising a trained machine learning model, current faulty code change scores for the multiple code changes by analyzing current change code data for the multiple code changes and current test case failure information for the plurality of test case failures;

obtaining historical-based faulty code change scores for the multiple code changes using historical code change tests and historical fault code change data;

merging, for respective code changes of the multiple code changes, the current fault code change scores and the historical-based faulty code change scores to obtain merged faulty code change scores;

ranking the multiple code changes based on the merged faulty code change scores to determine a likely faulty code change of the multiple code changes resulting in a test case failure of the plurality of test case failures;

identifying, based on the likely faulty code change determined from the ranking and based on relevance of test cases in the suite of test cases to the likely faulty code change, one or more test cases of the suite of test cases that are irrelevant to further testing the likely faulty code change, wherein the relevance of test cases in the suite of test cases to the likely faulty code change is determined based, at least in part, on functional relationships and shared test suites between code modules of the multiple code changes;

automatically customizing, based on the likely faulty code change, the suite of test cases by removing the identified one or more test cases from the suite of test cases irrelevant to further testing the likely faulty code change to generate a tailored test case set that facilitates verifying that the likely faulty code change is the faulty code change by reducing regression testing time while maintaining verification accuracy;

and continuing executing of the merged code within the development and operational (DevOps) computing environment using the tailored test case set to continue regression testing of the executing merged code to facilitate verifying that the likely faulty code change is the faulty code change.

9. The computer system of claim 8, wherein the the plurality of test case failures are classified into different test case failure classes, and wherein determining the likely faulty code change comprises using the test case failure classes to facilitate determining the likely faulty code change.

10. The computer system of claim 9, wherein classifying the plurality of test case failures comprises generating test case failure symptom groups based on data-analyzing the plurality of test case failures, and based on analyzing historical test case failure data, the test case failure symptom groups comprising groups of test cases exhibiting similar symptoms, wherein the test case failure symptom groups are the test case failure classes.

11. The computer system of claim 8, wherein the current faulty code change scores are generated for respective code changes of the multiple code changes based on relevance of the respective code changes to respective test case failure classes of the plurality of test case failures.

12. The computer system of claim 11, generating the current faulty code change scores comprises training the trained machine learning model using, at least in part, current change code data for the merged code and current test case failure information for the plurality of test case failures.

13. A computer program product for facilitating computing environment processing, the computer program product comprising:

one or more computer readable storage media and program instructions collectively stored on the one or more computer readable storage media readable by at least one processer to:

automatically self-tuning regression testing of executing merged code within a development and operational (DevOps) computing environment, the automatically self-tuning regression testing of executing merged code comprising:

executing the merged code using a suite of test cases to regression test the merged code, the merged code comprising multiple code changes;

obtaining, based on the executing of the merged code using the suite of test cases, a plurality of test case failures;

generating, using an artificial intelligence engine comprising a trained machine learning model, current faulty code change scores for the multiple code changes by analyzing current change code data for the multiple code changes and current test case failure information for the plurality of test case failures;

obtaining historical-based faulty code change scores for the multiple code changes using historical code change tests and historical fault code change data;

merging, for respective code changes of the multiple code changes, the current fault code change scores and the historical-based faulty code change scores to obtain merged faulty code change scores;

ranking the multiple code changes based on the merged faulty code change scores to determine a likely faulty code change of the multiple code changes resulting in a test case failure of the plurality of test case failures;

identifying, based on the likely faulty code change determined from the ranking and based on relevance of test cases in the suite of test cases to the likely faulty code change, one or more test cases of the suite of test cases that are irrelevant to further testing the likely faulty code change, wherein the relevance of test cases in the suite of test cases to the likely faulty code change is determined based, at least in part, on functional relationships and shared test suites between code modules of the multiple code changes;

automatically customizing, based on the likely faulty code change, the suite of test cases by removing the identified one or more test cases from the suite of test cases irrelevant to further testing the likely faulty code change to generate a tailored test case set that facilitates verifying that the likely faulty code change is the faulty code change by reducing regression testing time while maintaining verification accuracy;

and continuing executing of the merged code within the development and operational (DevOps) computing environment using the tailored test case set to continue regression testing of the executing merged code to facilitate verifying that the likely faulty code change is the faulty code change.

14. The computer program product of claim 13, wherein the plurality of test case failures are classified into different test case failure classes, and wherein determining the likely faulty code change comprises using the different test case failure classes to facilitate determining the likely faulty code change.

15. The computer program product of claim 13, wherein the current faulty code change scores are generated for respective code changes of the multiple code changes based on relevance of the respective code changes to respective test case failure classes of the plurality of test case failures.

* * * * *